(12) United States Patent
Kang et al.

(10) Patent No.: US 7,480,558 B2
(45) Date of Patent: Jan. 20, 2009

(54) METHOD AND APPARATUS FOR CONTROLLING A HOMOGENEOUS CHARGE COMPRESSION IGNITION ENGINE

(75) Inventors: Jun-Mo Kang, Ann Arbor, MI (US); Chen-Fang Chang, Troy, MI (US); Man-Feng Chang, Troy, MI (US); Nicole Wermuth, Ann Arbor, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 135 days.

(21) Appl. No.: 11/680,161

(22) Filed: Feb. 28, 2007

(65) Prior Publication Data

US 2008/0202469 A1 Aug. 28, 2008

(51) Int. Cl.
*G06F 19/00* (2006.01)
*F02M 25/07* (2006.01)
*F02B 47/08* (2006.01)

(52) U.S. Cl. .................. 701/108; 123/295; 123/568.21

(58) Field of Classification Search ................. 123/395, 123/299, 304, 305, 568.11, 568.14, 568.21, 123/672, 679, 698; 701/101–103, 108–111, 701/114, 115
See application file for complete search history.

(56) References Cited

U.S. PATENT DOCUMENTS

| | | | |
|---|---|---|---|
| 5,875,743 A * | 3/1999 | Dickey | 123/568.21 |
| 6,463,907 B1 | 10/2002 | Hiltner | |
| 6,698,394 B2 * | 3/2004 | Thomas | 123/241 |
| 6,807,937 B2 | 10/2004 | Gianolio et al. | |
| 6,986,342 B2 * | 1/2006 | Thomas | 123/536 |
| 7,128,063 B2 | 10/2006 | Kang | |
| 2006/0037567 A1 * | 2/2006 | Thomas | 123/56.7 |
| 2007/0246005 A1 * | 10/2007 | Sobotowski et al. | 123/304 |

FOREIGN PATENT DOCUMENTS

| | | |
|---|---|---|
| JP | 2004263562 A | 9/2004 |
| KR | 1020040019159 A | 3/2004 |

* cited by examiner

*Primary Examiner*—Willis R Wolfe, Jr.

(57) ABSTRACT

The invention comprises a method for controlling operation of a homogeneous charge combustion ignition engine operating in an auto-ignition mode. The method comprises determining a desired combustion phasing; and, controlling a mass flowrate of externally recirculated exhaust gas based upon an actual combustion phasing. A closed-loop control scheme is executed to control the mass flowrate of externally recirculated exhaust gas based upon a difference between the actual and the desired combustion phasing.

19 Claims, 5 Drawing Sheets

METHOD AND APPARATUS FOR CONTROLLING A HOMOGENEOUS CHARGE COMPRESSION IGNITION ENGINE

TECHNICAL FIELD

This invention relates to operation and control of homogeneous-charge compression-ignition (HCCI) engines.

BACKGROUND OF THE INVENTION

The statements in this section merely provide background information related to the present disclosure and may not constitute prior art.

In an HCCI (Homogeneous Charge Compression Ignition) engine, combustion is flameless, and occurs spontaneously occurs throughout the entire combustion chamber volume. The homogeneously mixed cylinder charge is auto-ignited as the cylinder charge is compressed and its temperature increases. The ignition timing of auto-ignited combustion depends on initial cylinder charge conditions including primarily temperature, pressure, and composition. Thus, it is important to coordinate engine control inputs, such as fuel mass, injection timing, and intake and exhaust valve motion, to ensure robust HCCI combustion. Depending on the motion of the intake and exhaust valves, there are two primary operating strategies in HCCI engines—an exhaust recompression strategy and an exhaust re-breathing strategy.

One of the major concerns in an application of an HCCI engine is that auto-ignited combustion is vulnerable to variations in fuel octane levels and variations in environmental conditions including ambient temperature and humidity. This is because such variations can change the cylinder charge conditions and, as a result, significantly affect the ignition timing of auto-ignited combustion, and may induce unwanted vibrations in engine output. Thus, it is important to coordinate the engine inputs/actuators in real time such that robust HCCI combustion can be maintained in the presence of such variations.

Figure 1:
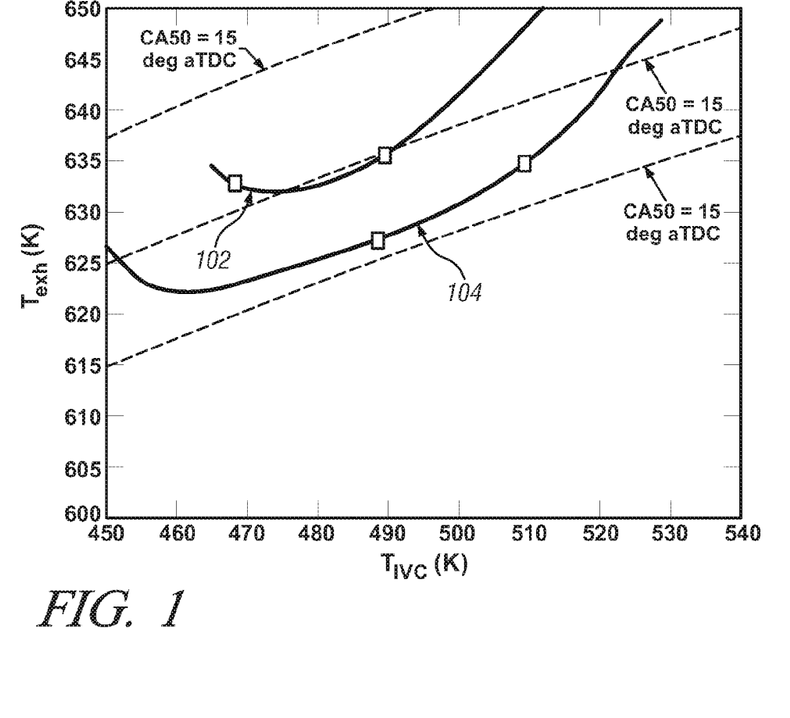
FIGS. 1, 2, and 3 are data graphs, in accordance with the present invention.
Figure 2:
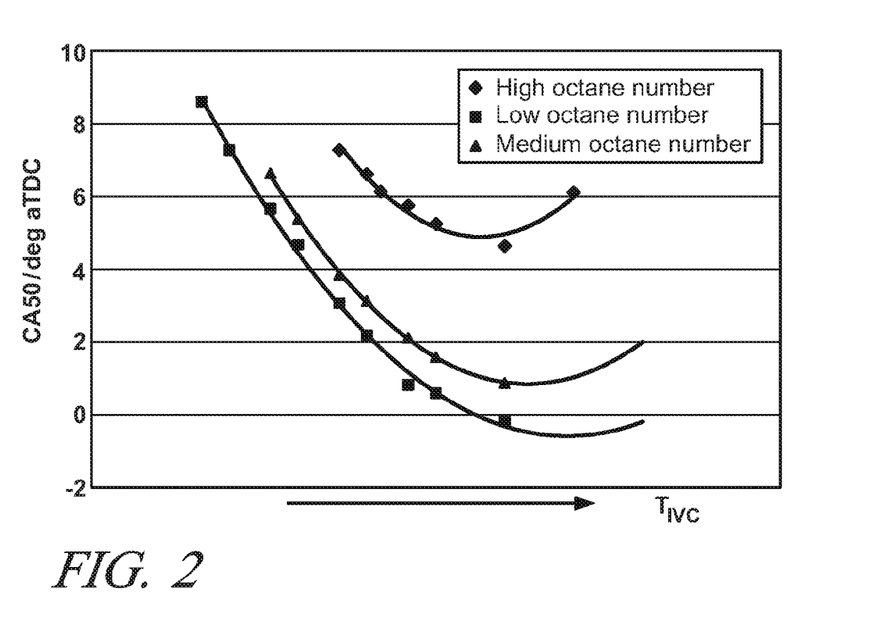

Referring now to FIG. 1, a data graph of cylinder charge temperature at intake valve closing (IVC) versus exhaust gas temperature (EXH) demonstrates typical steady state operating characteristics of combustion phasing of auto-ignited combustion of a typical HCCI engine, wherein differences in the ambient environment and the fuel octane are compared. The results are plotted for temperatures $T_{IVC}$ and $T_{EXH}$, wherein $T_{IVC}$ comprises temperature of an intake charge at intake valve closing and $T_{EXH}$ comprises the exhaust gas temperature. The dotted lines comprise lines of $T_{IVC}$ and $T_{EXH}$ required for constant combustion phasing, defined herein as a crank angle at which 50% of the inducted mass fuel is burned (CA50). The results indicate that the cylinder charge temperature varies with the amount of hot residual gas (i.e., internal EGR) trapped in the cylinder. One of the reasons that the combustion phasing is retarded in a high temperature zone is because the mixture eventually burns progressively slower due to a higher dilution level as the amount of hot residual gas trapped in the cylinder increases. The qualitative effect on combustion due to ambient environment and/or fuel octane changes can be seen by comparing Lines 102 and 104. For example, it is shown that combustion phasing retards with either an increase in fuel octane number or an increase in humidity. Referring now to FIG. 2, there is depicted experimental data from an exemplary HCCI engine operating with different types of fuel, which have varying octane numbers. The engine was operated at a fixed engine speed of about 1000 RPM, with a fixed fuel injection flowrate. The results indicate that combustion phasing retards as the octane number of the fuel increases from a low octane rating, to a medium octane rating, to a high octane rating. The octane rating comprises a standard fuel rating system used to describe or define an anti-knock quality, i.e., resistance to uncontrolled pre-ignition, of fuel intended for use in spark-ignition and HCCI engines. Resistance to uncontrolled pre-ignition increases with increased octane rating. The results depicted in FIG. 2 indicate that the characteristics of combustion phasing do not change qualitatively with environmental and/or fuel octane changes.

Figure 3:
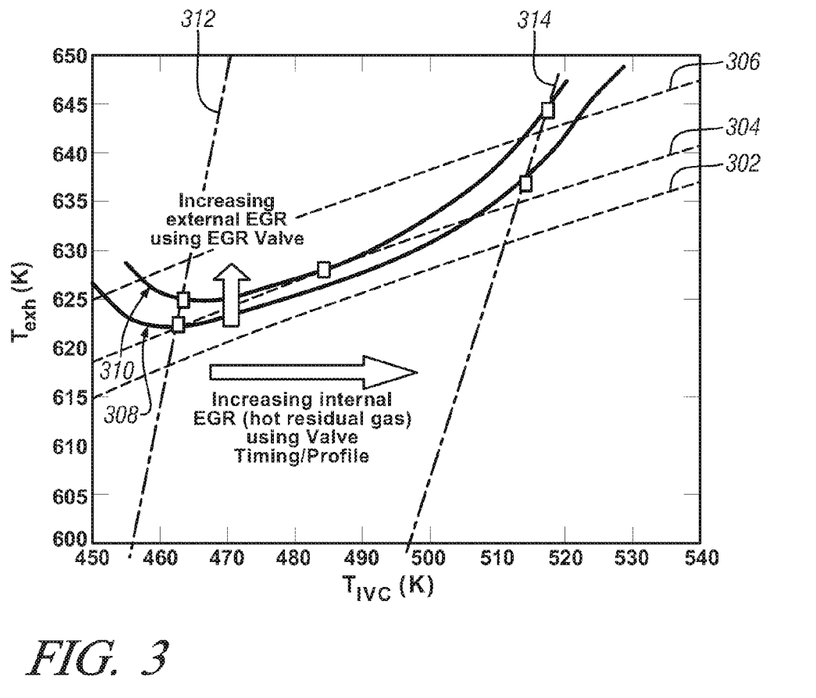

Referring now to FIG. 3, there are depicted steady state characteristics of combustion phasing of auto-ignited combustions with external EGR mass flow. Lines 302, 304, and 306 represent lines of constant combustion phasing, indicated by 50% of fuel mass burn-point (CA50), for crank angles of 0, 10, and 20 degrees after combustion top-dead-center (aTDC), respectively. Lines 312 and 314 represent relations between $T_{EXH}$ and $T_{IVC}$ with two different sets of constant valve timing and profile, and the valve timing and profile used in the line 312 introduces a lower internal EGR than those used in line 314. Line 308 represents HCCI engine operation without external EGR, and 310 represents HCCI engine operation with 5% external EGR. The results indicate that combustion phasing can be controlled by adjusting either internal or external EGR mass flow, or both. Typically, HCCI engines employ a mechanism to control valve timing/profile to adjust the internal EGR, e.g., cam phasing or a flexible valve control. The exhaust gas from the previous engine cycle is trapped and increases the charge temperature to a point sufficiently hot enough for auto-ignited combustion. The amount of the exhaust gas trapped in the cylinder determines charge temperature, and thus, the combustion phasing of auto-ignited combustion. However, as demonstrated by the results depicted in FIG. 3, combustion phasing does not monotonically change with internal EGR for all conditions. Thus, combustion phasing control using internal EGR is typically limited to operating conditions whereat the combustion phasing changes monotonically with internal EGR. Such operating conditions vary with environmental and fuel quality changes, which can change during real time operation. Without precise information about environmental and fuel quality changes, it is challenging to identify changes in operating conditions in real time.

The results depicted in FIG. 3 indicate that increasing external EGR mass flow monotonically increases temperature of exhaust gases for any given intake charge temperature. Therefore, combustion phasing can be controlled by adjusting and controlling external EGR flow mass. This monotonic relation exists between combustion phasing and external EGR regardless of ambient environment and/or fuel octane variations. Thus, changes in the external EGR can be used to control combustion phasing of auto-ignited combustion in response to changes in ambient environment and/or fuel octane. The figures demonstrate that although combustion phasing shifts with changes in one of the ambient environment the fuel octane, the qualitative behavior of combustion over the cylinder charge temperature remains the same.

The invention described hereinafter comprises a method and a control scheme to control operation of an HCCI engine to compensate for variations in ambient conditions and engine fuel octane, especially fuel octane level.

SUMMARY OF THE INVENTION

In accordance with an embodiment of the invention, there is provided a method for controlling operation of an HCCI engine operating in an auto-ignition mode. The method comprises determining a desired combustion phasing; and, controlling a mass flowrate of externally recirculated exhaust gas based upon an actual combustion phasing. An aspect of the invention comprises executing a closed-loop control scheme to control the mass flowrate of externally recirculated exhaust gas based upon a difference between the actual and the desired combustion phasing. Thus mass flow of externally recirculated exhaust gas is adjusted to compensate the combustion phasing error caused by variations in the ambient environment and/or fuel octane.

DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF EXEMPLARY EMBODIMENTS

Figure 4:
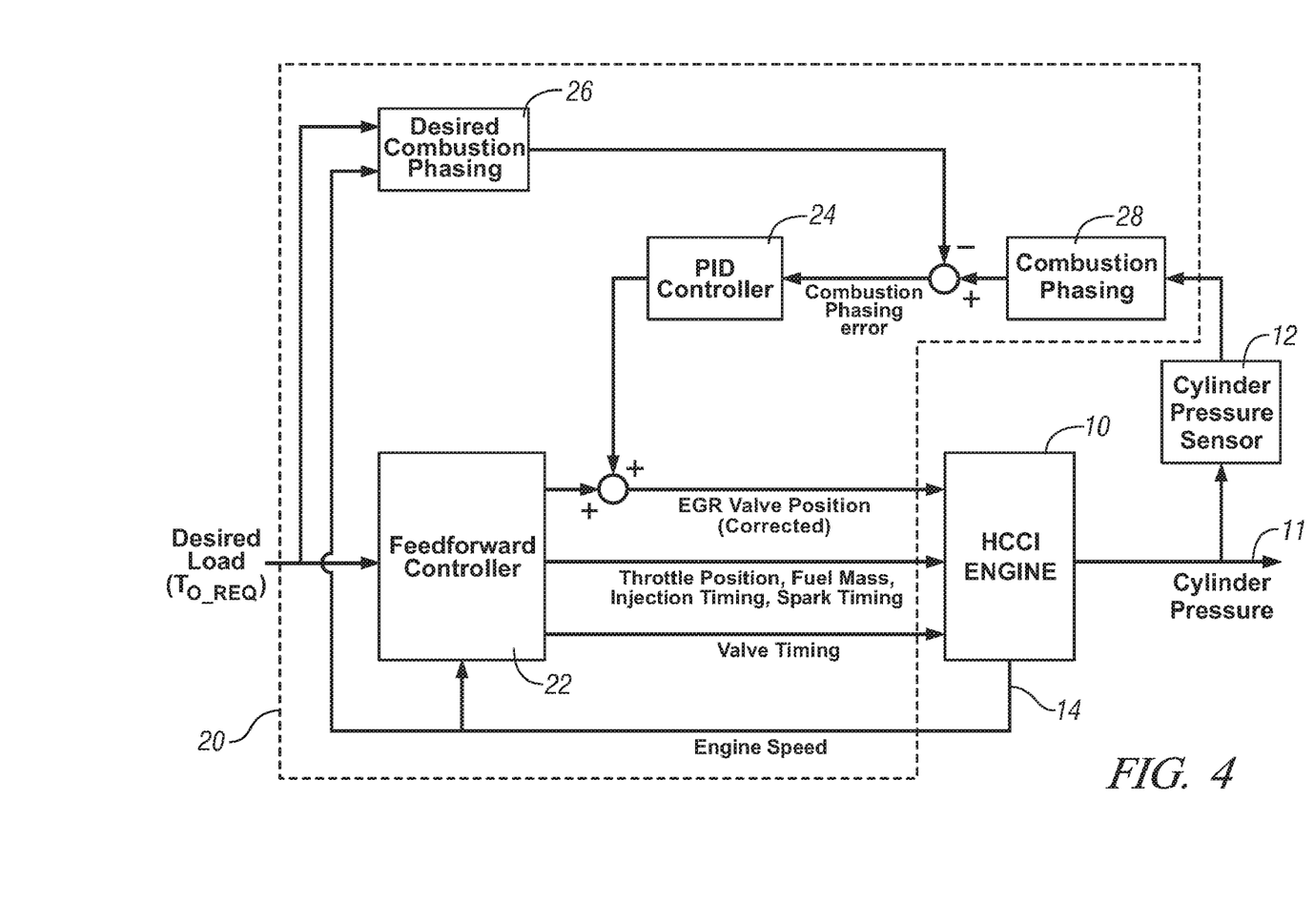
FIG. 4 is a schematic diagram of a control scheme, in accordance with the present invention.
Figure 6:
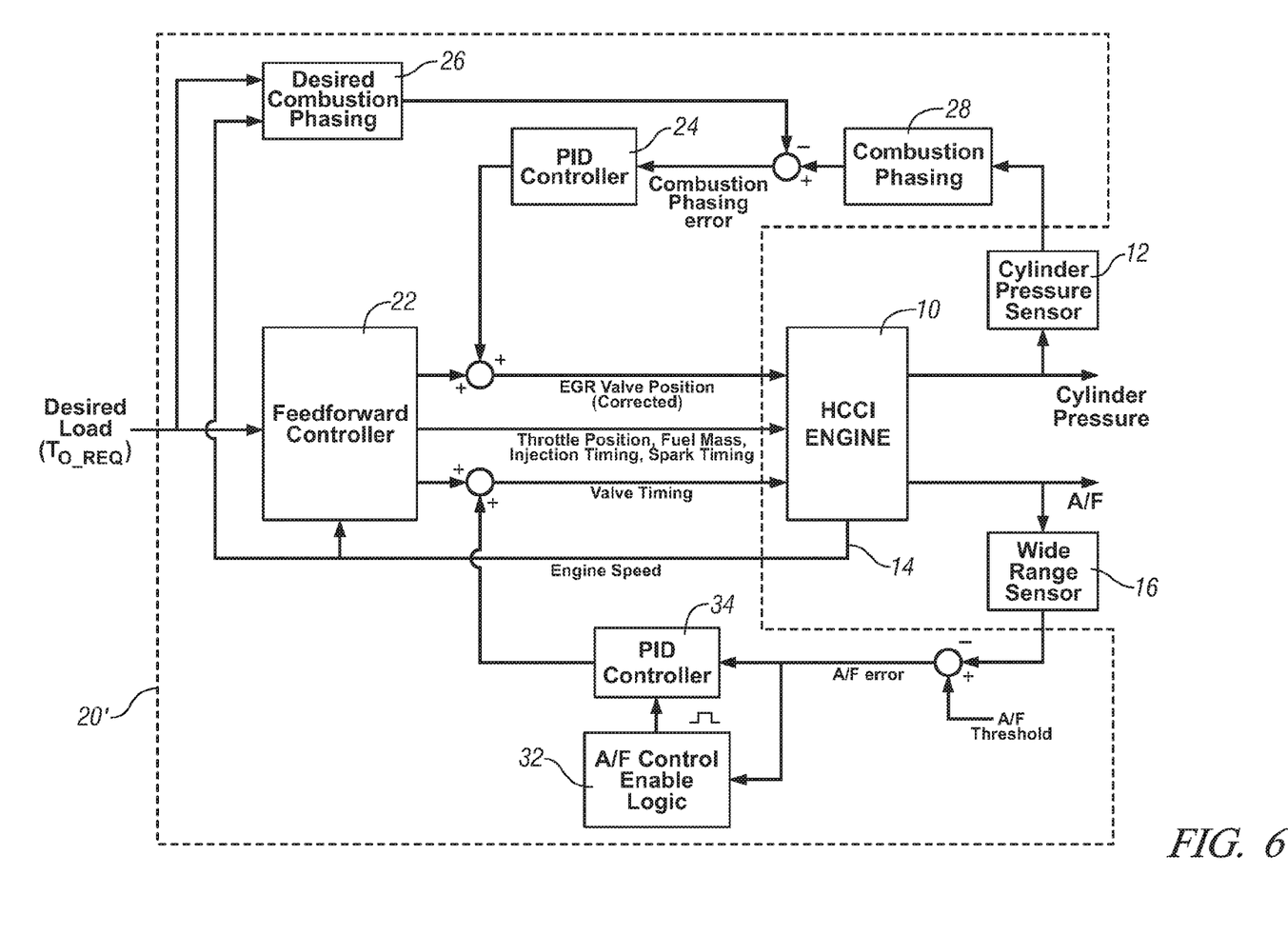
FIG. 6 is a schematic diagram of a control scheme, in accordance with the present invention; and, FIG. 7 is a data graph, in accordance with the present invention.

Referring now to the drawings, wherein the depictions are for the purpose of illustrating the invention only and not for the purpose of limiting the same, FIGS. 4 and 6 depict block diagrams of control schemes constructed in accordance with embodiments of the invention. Overall, the control schemes are each executed in a control module 20 adapted to control operation of an internal combustion engine 10 operative in an auto-ignition mode, referred to as homogeneous-charge compression ignition (HCCI). The exemplary engine comprises a known multi-cylinder direct-injection four-stroke internal combustion engine 10 having reciprocating pistons movable in cylinders which define variable volume combustion chambers. There is an air intake manifold which supplies air into each combustion chamber, with air flow controlled by intake valves, and combusted gases flow from the combustion chambers to an exhaust manifold via exhaust passages controlled by exhaust valves. There is an external flow passage for recirculating exhaust gases between the engine intake and the engine exhaust having a flow control valve, referred to as an exhaust gas recirculation (EGR) valve (not shown). The EGR valve is controlled by the control module 20 and is operative to control mass flow of exhaust gas to the engine air intake. The exemplary engine 10 can be equipped with a controllable valve train to control openings and closings of the intake and exhaust valves, including any one or more of valve timing, phasing, and magnitude of valve openings. The engine includes a fuel injection system by which a fuel mass is delivered, and a spark ignition system by which spark energy is provided for igniting or assisting in igniting cylinder charges in the combustion chambers. There is a throttle valve, typically electronically controlled in response to operator input and other engine controls. A spark plug is employed to enhance the ignition timing control of the engine at certain conditions (e.g. during cold start and near the low load operation limit). It has proven preferable to rely on spark ignition near the high part-load operation limit under controlled auto-ignition combustion and during high speed/load operating conditions with throttled or non-throttled spark-ignition operation.

The engine is equipped with various sensing devices for monitoring engine operation, including an engine rotational speed sensor, a sensor 12 for monitoring combustion, and, a wide range air/fuel ratio sensor 16, depicted in FIG. 6. The combustion sensor described herein comprises a sensor device operative to monitor a combustion parameter, depicted herein as a cylinder pressure sensor to monitor incylinder combustion pressure. It is understood that other sensing systems used to monitor cylinder pressure or another combustion parameter which can be translated into combustion phasing are included within the scope of the invention, e.g., ion-sense ignition systems.

The engine is designed to operate in an un-throttled mode on gasoline or similar fuel blends with HCCI combustion over an extended range of engine speeds and loads, including engine starting where possible. However spark ignition and throttle-controlled operation may be utilized with conventional or modified control methods under conditions not conducive to HCCI operation and to obtain maximum engine power to meet an operator torque request. Applicable fueling strategies can include any one of direct cylinder injection, port fuel injection, and, throttle body fuel injection. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present invention.

The control module 20 executes algorithmic code stored therein to generate inputs to control engine operation, including throttle position, spark timing, fuel injection mass and timing, intake and/or exhaust valve timing and phasing, and EGR valve position to control flow of recirculated exhaust gases. Valve timing and phasing includes negative valve overlap (NVO in an exhaust recompression strategy) and lift of exhaust valve reopening (in an exhaust-re-breathing strategy). The control module is adapted to receive input signals from an operator (e.g., throttle pedal position) to determine an operator torque request ($T_{O\_REQ}$) and from sensors indicating the engine speed (RPM), intake air temperature, coolant temperature and ambient conditions. The control module 20 operates to determine from lookup tables instantaneous control settings for spark timing (as needed), EGR valve position, intake and exhaust valve timing and/or lift set points, and fuel injection timing, and calculates the burned gas fractions in the intake and exhaust systems. Further details of an exemplary HCCI engine and control system are found in commonly assigned U.S. patent application Ser. No. 11/366,217 filed Mar. 2, 2006, entitled "Load Transient Control Methods for Direct-Injection Engines with Controlled Auto-Ignition Combustion", the contents of which are incorporated by reference.

Referring again to FIG. 4, the first embodiment of the control scheme is depicted. Operation of the exemplary HCCI engine 10 is controlled by controlling actuators, including EGR valve position, throttle position, fuel mass and injection timing, spark ignition timing and control, intake and exhaust valve timing and phasing control. Monitored engine outputs comprise engine speed 14 (in RPM) and combustion phasing, shown herein in the form of cylinder pressure 11 measured using the cylinder pressure sensor 12, and various other sensed or estimated outputs necessary for ongoing operation and control. The control scheme, executed in the control module 20, monitors the engine speed, and the operator request for torque ($T_{O\_REQ}$), or desired load. The control scheme includes a feedforward controller 22 and a PID controller 24. The feedforward controller 22 is preferably executed utilizing information from predetermined calibrations to achieve a successful HCCI combustion under steady state operating conditions. In a system utilizing only feedforward control, combustion phasing may suffer from disturbances and/or environmental changes. Disturbances include, for example, significant or rapid changes in engine speed and load, which typically occur during ongoing vehicle engine operation.

In operation, the feedforward controller 22 monitors the operator torque request and the engine speed, and determines control states for open-loop EOR valve position, throttle position, fuel mass and injection timing, spark ignition timing and control, and valve timing and phasing control. A desired combustion phasing 26 is determined based upon the operator torque request and the engine speed, to achieve combustion phasing consistent with the characteristic engine operation, as shown with regard to FIG. 5. Actual combustion phasing 28 is determined based upon a state of the monitored combustion parameter. For example, when the monitored combustion parameter comprises cylinder pressure, the combustion phasing calculation comprises determining a location of peak cylinder pressure, or 50% of the induced mass fuel burned relative to engine crank angle. A combustion phasing error is determined as a difference between the actual and the desired combustion phasings. The combustion phasing error is input to PID controller 24 or other suitable controller, which generates a correction which is added to the open-loop EGR valve position. The EGR valve is controlled to a corrected valve position based thereon. The corrected EGR valve position comprises a command for an external EGR mass flowrate based upon a difference between the desired combustion phasing and the actual combustion phasing.

Figure 5:
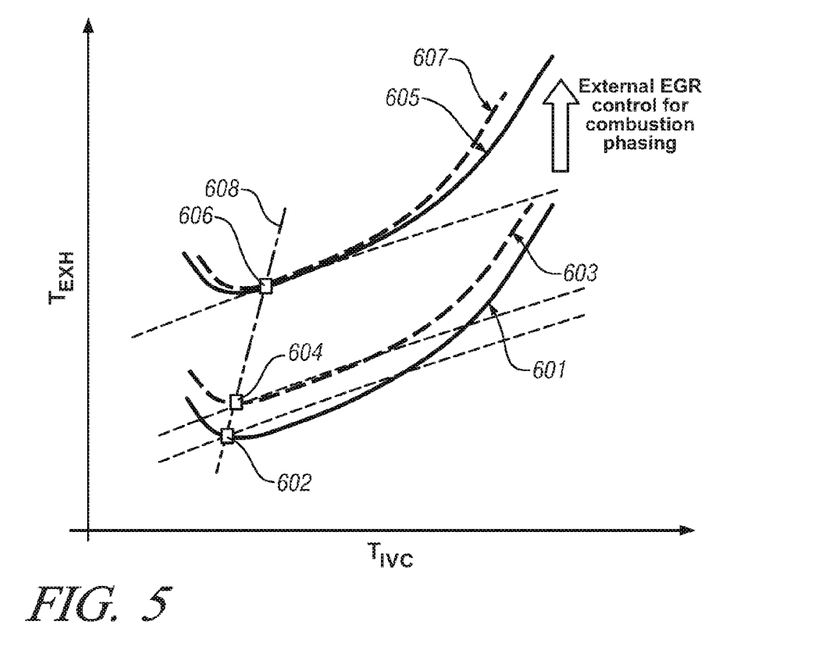
FIG. 5 is a data graph, in accordance with the present invention.

Referring now to FIG. 5, a data graph depicts combustion characteristics, plotted as combustion temperatures at intake valve closing (IVC) and at the exhaust valve (EXH), i.e., $T_{IVC}$ v. $T_{EXH}$, of operating the exemplary engine and control module described with reference to FIG. 4 under steady state for two different types (octane numbers) of fuel. Line 601 depicts open-loop operation with low octane fuel and no external EGR; Line 603 depicts open-loop operation with high octane fuel and no external EGR; and, points 602 and 604 comprise equilibrium points with a constant valve timing and profile. Line 605 depicts closed-loop operation with low octane fuel and with external EGR; Line 607 depicts closed-loop operation with high octane fuel and external EGR; Line 608 represents a relationship between $T_{EXH}$ and $T_{IVC}$ for a constant valve timing and profile; and, point 606 comprises a common equilibrium point with constant valve timing and profile. In steady state engine operation, open-loop combustion phasing of auto-ignited combustion typically advances as the octane number of the fuel used in the engine decreases. When the closed-loop control based upon combustion phasing described with reference to FIG. 4 is implemented, the combustion phasing is controlled at the desired value by adjusting external EGR regardless of the octane number of the fuel. Because the characteristics of combustion phasing do not change qualitatively with changes in ambient environment and/or fuel octane, the qualitative behavior of combustion over the cylinder charge temperature remains the same under varying operating conditions, and the mass flow rate of external EGR is adjusted to compensate the combustion phasing error caused by variations in ambient environment and/or fuel octane.

Referring again to FIG. 6, the second embodiment of the control scheme is depicted, comprising combining the combustion phasing control an air-fuel ratio controller to control the air-fuel ratio to be above a certain threshold using by control of valve timing and phasing using valve control actuators. Thus, specific engine designs that are more sensitive to changes in ambient environment and/or fuel octane can control engine operation using the external EGR and valve train control to control air-fuel ratio and compensate any combustion phasing errors. In this embodiment, the exemplary HCCI engine 10 has control inputs including EGR valve position, throttle position fuel mass and injection timing, spark ignition timing and control, and intake and exhaust valve control capability. Monitored engine outputs comprise engine speed (in RPM) 14 and combustion phasing, shown herein in the form of measured cylinder pressure 11, and air/fuel ratio, shown herein monitored by an air/fuel ratio sensor 16. The control scheme, executed in control module 20', has inputs including the engine speed and the operator torque request ($T_{O\_REQ}$). The control scheme includes the feedforward controller 22, the PID controller 24 and a second PID controller 34 with associated air/fuel ratio control-enable logic 32. In operation, the feedforward controller 22 monitors the operator torque request and the engine speed, and determines control states for open-loop EGR valve position, throttle position, fuel mass and injection timing, spark ignition timing and control, and valve timing and phasing control. A desired combustion phasing 26 is determined based upon the operator torque request and the engine speed, to achieve combustion phasing consistent with the characteristic engine operation, as shown with regard to FIG. 7. Actual combustion phasing 28 is determined based upon a state of the monitored combustion parameter, as previously described. The combustion phasing error is determined as a difference between the actual and the desired combustion phasings. The combustion phasing error is input to PID controller 24, which generates the correction for the open-loop EGR valve position. The control scheme controls the EGR valve to the corrected valve position based thereon. The corrected EGR valve position comprises a command for an external EGR mass flowrate based upon a difference between the desired combustion phasing and the actual combustion phasing. Output of the air/fuel ratio sensor 16 is compared to an air/fuel ratio threshold, and an A/F error is determined. The A/F error is input to the second PID controller 34 and the A/F control enable logic 32, which determines whether to permit any control of the valve timing or phasing based upon the air/fuel ratio. Under conditions when valve control is permitted, valve timing or phasing correction is added to the valve timing output from the feedforward controller 22, and the valve control is executed. In one example, this valve control comprises controlling phasing of opening of the engine valves based upon a difference between the engine air/fuel ratio and the threshold, to achieve the desired combustion phasing and maintain stable operation of the engine over the range of fuel octane levels and ambient conditions. Thus, when there is low-octane fuel, an excessive amount of external EGR can be commanded by the controller 24 and as a result, charge volume for fresh air decreases, decreasing the air/fuel ratio. If air/fuel ratio decreases lower than the air/fuel ratio threshold, it is considered by the A/F control enable logic 32 that low-octane fuel is in use, and the air/fuel ratio control using valve timing control is activated to avoid rich combustion. The controller can act to decrease internal EGR (residual gas) and increase fresh air intake, while maintaining the desired combustion phasing.

Figure 7:
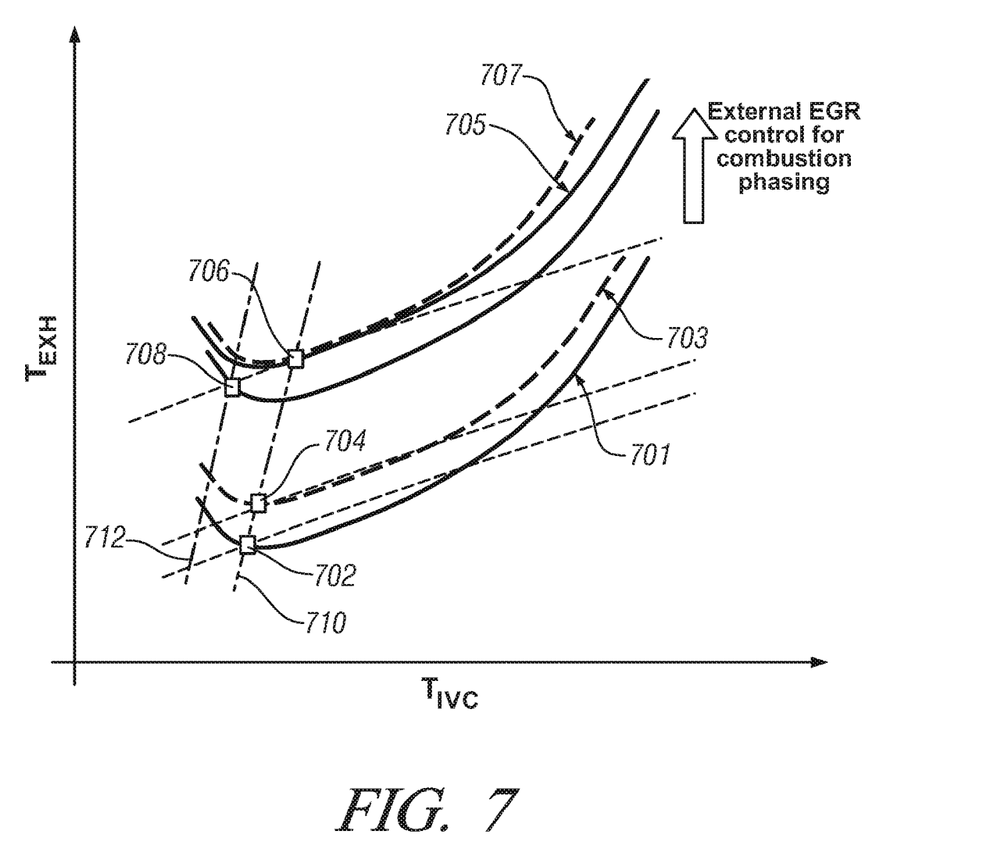

Referring now to FIG. 7, a data graph depicts combustion characteristics ($T_{IVC}$ v. $T_{EXH}$) of operating the exemplary engine and control module described with reference to FIG. 6 under steady state for two different types (octane numbers) of fuel. Line 701 depicts open-loop operation with low octane fuel and no external EGR; Line 703 depicts open-loop operation with high octane fuel and no external EGR; and, points 702 and 704 comprise equilibrium points with a constant valve timing and profile. Line 705 depicts closed-loop operation with low octane fuel and with external EGR; Line 707 depicts closed-loop operation with high octane fuel and external EGR; and, point 706 comprises an equilibrium point with constant valve timing and profile; point 708 comprises an equilibrium point with an adjusted valve timing and/or profile; and, Lines 710 and 712 represent relations between $T_{EXH}$ and $T_{IVC}$ with two different sets of constant valve timing and profile, and the valve timing and profile used in the line 712 introduces a lower internal EGR than those used in line 710. This qualitatively depicts the resulting steady state combustion characteristics with the controller shown in FIG. 6 when an HCCI engine is operated with two different types (octane numbers) of fuel. As can be seen, the combustion phasing controller adjusts external EGR to control the combustion phasing to the desired value regardless of the octane number of the fuel. In particular, line 710 can be shifted to line 712 in a case when an excessive amount of external EGR is required to compensate the combustion phasing error due, e.g., to low octane fuel. In this case, the air-fuel ratio controller is activated to decrease internal EGR while increasing fresh air using the valve timing/profile to maintain the air-fuel ratio above a user-defined threshold. Therefore, robust controlled auto-ignition combustion is maintained by providing sufficient air for combustion.

While the invention has been described by reference to certain preferred embodiments, it should be understood that changes can be made within the spirit and scope of the inventive concepts described. Accordingly, it is intended that the invention not be limited to the disclosed embodiments, but that it have the full scope permitted by the language of the following claims.

The invention claimed is:

1. Article of manufacture, comprising a storage medium containing a machine-executable program operative to control a homogeneous charge combustion ignition engine selectively operative in an auto-ignition mode and having an EGR valve operative to externally recirculate exhaust gas to an engine intake, the program comprising:
   code to operate the engine in the auto-ignition mode;
   code to determine a desired combustion phasing; and,
   code to control the EOR valve to achieve a mass flowrate of externally recirculated exhaust gas based upon an actual combustion phasing and the desired combustion phasing.

2. The article of claim 1, further comprising: code comprising a closed-loop control scheme operative to control the mass flowrate of externally recirculated exhaust gas based upon a difference between the combustion phasing and the desired combustion phasing.

3. The article of claim 1, wherein the homogeneous charge combustion ignition engine includes controllable intake and exhaust valves and the engine including an air/fuel ratio sensing device, the code further comprising:
   code to determine an engine air/fuel ratio from the air/fuel ratio sensing device;
   code to compare the air/fuel ratio to a threshold; and,
   code to selectively adjust control of the engine valves based upon the engine air/fuel ratio and the threshold air/fuel ratio.

4. The article of claim 3, further comprising: code to control the mass flowrate of externally recirculated exhaust gas to maintain the engine air/fuel ratio below the threshold air/fuel ratio.

5. The article of claim 3, further comprising: code to selectively control overlap of intake and exhaust valves to decrease internal exhaust gas recirculation, and, code to adjust the mass flowrate of externally recirculated exhaust gas based upon the actual combustion phasing and the desired combustion phasing.

6. Method for controlling combustion phasing of a homogeneous charge combustion ignition engine operating in an auto-ignition mode under varying conditions of fuel octane and ambient environment, comprising:
   monitoring the combustion phasing and engine air-fuel ratio;
   controlling a mass flowrate of externally recirculated exhaust gas based upon the combustion phasing and the engine air-fuel ratio.

7. The method of claim 6, further comprising: monitoring engine air-fuel ratio, and controlling the mass flowrate of externally recirculated exhaust gas to maintain the engine air/fuel ratio below a threshold air/fuel ratio.

8. The method of claim 6, further comprising controlling combustion phasing of the homogeneous charge combustion ignition engine under varying conditions of ambient environment comprising one of ambient temperature, ambient pressure, and humidity.

9. The method of claim 6, wherein controlling the mass flowrate of externally recirculated exhaust gas based upon the combustion phasing further comprises determining a desired combustion phasing based upon an operator torque request and engine speed.

10. The method of claim 9, further comprising executing a closed-loop control scheme to control the mass flowrate of externally recirculated exhaust gas based upon a difference between the combustion phasing and the desired combustion phasing.

11. Method for controlling operation of a homogeneous charge combustion ignition engine operating in an auto-ignition mode, comprising:
   determining a desired combustion phasing; and,
   controlling a mass flowrate of externally recirculated exhaust gas based upon an actual combustion phasing and the desired combustion phasing.

12. The method of claim 11, wherein the homogeneous charge combustion ignition engine includes controllable intake and exhaust valves, the method further comprising:
   determining an engine air/fuel ratio;
   comparing the air/fuel ratio to a threshold; and,
   selectively adjusting control of the engine valves based upon the engine air/fuel ratio and the threshold.

13. The method of claim 12, wherein selectively adjusting control of the engine valves comprises controlling phasing of one of the intake and the exhaust valves based upon a difference between the engine air/fuel ratio and the threshold.

14. The method of claim 12, further comprising selectively controlling overlap of intake and exhaust valves to decrease internal exhaust gas recirculation, and, adjusting the mass flowrate of externally recirculated exhaust gas based upon the actual combustion phasing and the desired combustion phasing.

15. The method of claim 11, further comprising executing a closed-loop control scheme to control the mass flowrate of externally recirculated exhaust gas based upon a difference between the actual combustion phasing and the desired combustion phasing.

16. The method of claim 15, wherein the desired combustion phasing is determined based upon engine speed and an operator torque request.

17. The method of claim 15, wherein the combustion phasing comprises an engine crank angle at which fifty percent of a cylinder charge fuel mass is burned.

18. The method of claim 17, wherein the combustion phasing is determined based upon a crank angle location of a peak cylinder pressure.

19. The method of claim 17, wherein the combustion phasing is determined based upon ion-sense monitoring of the combustion.

* * * * *